(12) United States Patent
Futamata et al.

(10) Patent No.: US 9,856,986 B2
(45) Date of Patent: Jan. 2, 2018

(54) VALVE DEVICE

(71) Applicant: SUMITOMO RUBBER INDUSTRIES, LTD., Kobe-shi, Hyogo (JP)

(72) Inventors: Kazuo Futamata, Kobe (JP); Takeshi Ishimaru, Kobe (JP); Kouhei Morita, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/107,869

(22) PCT Filed: Oct. 10, 2014

(86) PCT No.: PCT/JP2014/077136
§ 371 (c)(1),
(2) Date: Jun. 23, 2016

(87) PCT Pub. No.: WO2015/098239
PCT Pub. Date: Jul. 2, 2015

(65) Prior Publication Data
US 2016/0334024 A1    Nov. 17, 2016

(30) Foreign Application Priority Data

Dec. 24, 2013    (JP) ................... 2013-265791

(51) Int. Cl.
*B01L 3/00*    (2006.01)
*F16K 11/052*    (2006.01)
(Continued)

(52) U.S. Cl.
CPC .......... *F16K 11/0525* (2013.01); *B01L 3/567* (2013.01); *F16K 7/14* (2013.01);
(Continued)

(58) Field of Classification Search
CPC ...... F16K 11/0525; F16K 7/14; F16K 25/005; F16K 31/0641; F16K 31/05; B01L 3/567; Y10T 137/86847
See application file for complete search history.

(56) References Cited

U.S. PATENT DOCUMENTS 2,686,533 A  *  8/1954  Gratzmuller .......... F16K 17/085
                                               137/510
4,986,308 A  *  1/1991  Champseaux ............ F16K 7/16
                                              137/625.44
(Continued)

FOREIGN PATENT DOCUMENTS

JP    62-174175 U    11/1987
JP    10-184948 A     7/1998
(Continued)

OTHER PUBLICATIONS

European Search Report for Application No. 14875065.6 dated Sep. 4, 2017.

*Primary Examiner* — Atif Chaudry
*Assistant Examiner* — Kevin Barss
(74) *Attorney, Agent, or Firm* — Birch, Stewart, Kolasch & Birch, LLP

(57) ABSTRACT

The valve device has a valve main body defining a valve chest provided with a NO outlet port and a NC outlet port through which a fluid flows, and a valve for opening/closing the NC outlet port and NO outlet port. The valve includes a diaphragm disposed so as to cover the valve chest, and a drive means for pressing the diaphragm to open/close the NC outlet port and NO outlet port. The first valve seat and the second valve seat are formed around the NC outlet port and NO outlet port. The diaphragm is made of an elastic material of which JIS-K6253 durometer A hardness is A50-
(Continued)

A85. The pressure of the diaphragm seated on the first valve seat and the second valve seat is 0.5-1.0 N/sq·mm.

9 Claims, 7 Drawing Sheets

(51) Int. Cl.
*F16K 27/02* (2006.01)
*F16K 31/06* (2006.01)
*F16K 7/14* (2006.01)
*F16K 31/10* (2006.01)
*F16K 25/00* (2006.01)

(52) U.S. Cl.
CPC ........ *F16K 25/005* (2013.01); *F16K 31/0641* (2013.01); *F16K 31/105* (2013.01); *B01L 2300/123* (2013.01); *B01L 2400/0622* (2013.01); *B01L 2400/0638* (2013.01); *Y10T 137/86501* (2015.04)

(56) References Cited

U.S. PATENT DOCUMENTS

| | | | | |
|---|---|---|---|---|
| 5,027,857 A | * | 7/1991 | Champseix | F16K 7/16 137/625.44 |
| 5,337,785 A | * | 8/1994 | Romer | F16K 7/16 137/596.17 |
| 5,983,941 A | * | 11/1999 | Fritz | F16K 11/052 137/625.44 |
| 6,003,552 A | * | 12/1999 | Shank | F16K 7/16 137/625.44 |
| 6,220,299 B1 | * | 4/2001 | Arvidsson | F16K 7/16 137/329.05 |
| 6,318,408 B1 | | 11/2001 | Fukano et al. | |
| 6,394,136 B1 | * | 5/2002 | Rohrbeck | F16K 11/052 137/625.44 |
| 6,484,754 B1 | * | 11/2002 | Muth | F16K 11/052 137/625.44 |
| 6,726,173 B2 | * | 4/2004 | Hettinger | F16K 31/0682 251/129.17 |
| 7,070,162 B2 | * | 7/2006 | Dzialakiewicz | F16K 31/0682 251/129.08 |
| 7,779,867 B2 | * | 8/2010 | Bai | F16K 7/14 137/625.44 |
| 8,434,514 B2 | * | 5/2013 | Bezold | F16K 11/022 137/625.44 |
| 8,752,584 B2 | * | 6/2014 | Grandvallet | F16K 31/0603 137/553 |
| 8,893,747 B2 | * | 11/2014 | Weiβ | F16K 31/06 137/625.44 |
| 9,091,368 B2 | * | 7/2015 | Scheibe | F16K 31/52 |
| 2012/0321875 A1 | * | 12/2012 | Nakahama | C08L 23/16 428/220 |
| 2016/0091099 A1 | * | 3/2016 | Scheibe | F16K 7/12 137/625.48 |

FOREIGN PATENT DOCUMENTS

| | | |
|---|---|---|
| JP | 2000-297876 A | 10/2000 |
| JP | 2005-163924 A | 6/2005 |
| JP | 2009-24037 A | 2/2009 |
| JP | 2010-54848 A | 3/2010 |

* cited by examiner (a)

(b)

VALVE DEVICE

TECHNICAL FIELD

The present invention relates to a valve device to be used in various analyzing devices such as chemical testing devices, environmental analyzing devices and biotechnology research devices.

BACKGROUND ART

In such various analyzing devices, important problems are an improvement of the measurement accuracy, an improvement of the inspecting speed, minimization of a specimen and a reagent, and downsizing of the device. And a valve device for controlling a flow rate of a fluid used in the measurement is required to be further improved in its performance. In such valve device, a diaphragm made of a rubber material or the like having elasticity is employed as a valve opening/closing mechanism in order to realize excellent chemical resistance. The diaphragm forms a bulkhead that divides a valve chest, and receives an external driving force to switch fluid passages.

In this kind of valve device, in order to precisely control the flow rate of the fluid, it is necessary to improve the sealing capability of the diaphragm at the time of closing of a port. The sealing capability of the diaphragm at the time of closing the port can be improved by increasing the load for pressing the diaphragm when seating the diaphragm on a valve seat formed around the opening of the port, i.e., the pressure of the diaphragm on the valve seat when seated.

However, when a large load is applied to the diaphragm, the fatigue of the rubber material constituting the diaphragm is accelerated, and the life of the diaphragm may be shortened. Further, it is concerned that in order to press the diaphragm with a large load, a proportionate driving means is required, and the valve device increase in size.

Under these circumstances, the following Patent Document 1 discloses a valve mechanism of a valve device whose diaphragm is driven by a solenoid, a first spring member, a second spring member and the like, in which the resilient force (spring force) of the second spring member is set to be twice the resilient force of the first spring member.

PRIOR ART DOCUMENT

Patent Document

Patent Document 1: Japanese Unexamined Patent Publication No.

However, even in the above-described valve device, it is difficult to achieve both of the diaphragm's sealing capability and durability, while reducing the size of the device.

SUMMARY OF THE INVENTION

Problems to be Solved by the Invention

In view of the circumstances as described above, the present invention was made, and a main object is to provide a valve device in which both of the diaphragm's sealing capability and durability can be achieved, while reducing the size.

Means for Solving the Problems

The present invention is a valve device having
a valve main body defining a valve chest having at least one port through which fluid flows,
a valve for opening and closing the port, and
a drive means for driving the valve to open and close the port,
the port having an opening around which a valve seat is formed,
the valve disposed so as to cover the valve chest and having a diaphragm for seating on or separating from the valve seat to open and close the port,
characterized in that
the diaphragm is made of an elastic material whose durometer A hardness in JIS-K6253 is A50 to A85, and
the pressure of the diaphragm on the valve seat when seated is 0.5 to 1.0 N/sq·mm.

In the valve device according to the present invention, it is desirable that the durometer A hardness in JIS-K6253 of the diaphragm is A60 to A80.

In the valve device according to the present invention, it is desirable that the diaphragm includes, as a rubber component, at least one kind of ethylene-propylene-diene, fluorinated rubber, hydrogenated nitrile rubber, butylene rubber and silicone rubber.

In the valve device according to the present invention, it is desirable that the diaphragm includes, as fillers, at least one kind of calcium carbonate, silica, barium sulfate, talc and carbon black.

In the valve device according to the present invention, it is desirable that the port has an inlet port for flowing a fluid into the valve chest, and an outlet port for flowing out the fluid from the valve chest, and
the diaphragm opens and closes at least one of the inlet port and the outlet port.

In the valve device according to the present invention, it is desirable that
the port has an inlet port for flowing a fluid into the valve chest, and an outlet port for flowing out the fluid from the valve chest,
the outlet port provides two systems of a first outlet port and a second outlet port, and
the diaphragm opens and closes the first outlet port and the second outlet port.

In the valve device according to the present invention, it is desirable that
the diaphragm is intended to open and close the first outlet port and the second outlet port alternately, and
the difference between the pressure of the diaphragm seated on the valve seat of the first outlet port and the pressure of the diaphragm seated on the valve seat of the second outlet port is not more than 0.40 N/sq·mm.

In the valve device according to the present invention, it is desirable that the valve is driven by the driving means to swing and to open and close the port.

In the valve device according to the present invention, it is desirable that the valve is rotatably supported by a shaft member.

Effect of the Invention

The diaphragm of the valve device of the present invention is made of the elastic material whose durometer A hardness in JIS-K6253 is A50 to A85, and the pressure on the valve seat, of the diaphragm seated thereon is 0.5 to 1.0 N/sq·mm.

As the hardness of the diaphragm and the seating pressure are improved in this manner, the diaphragm is prevented from being excessively deformed at the time of sitting, and it is possible to improve the durability of the diaphragm. At the same time, the diaphragm is moderately deformed for the valve seat, and it is possible to obtain sufficient sealing capability.

Further, the driving means can be miniaturized since there is no need to press the diaphragm at an excessively large load.

MODE FOR CARRYING OUT THE INVENTION

Hereinafter, an embodiment of the present invention will be described with reference to the accompanying drawings.

Figure 1:
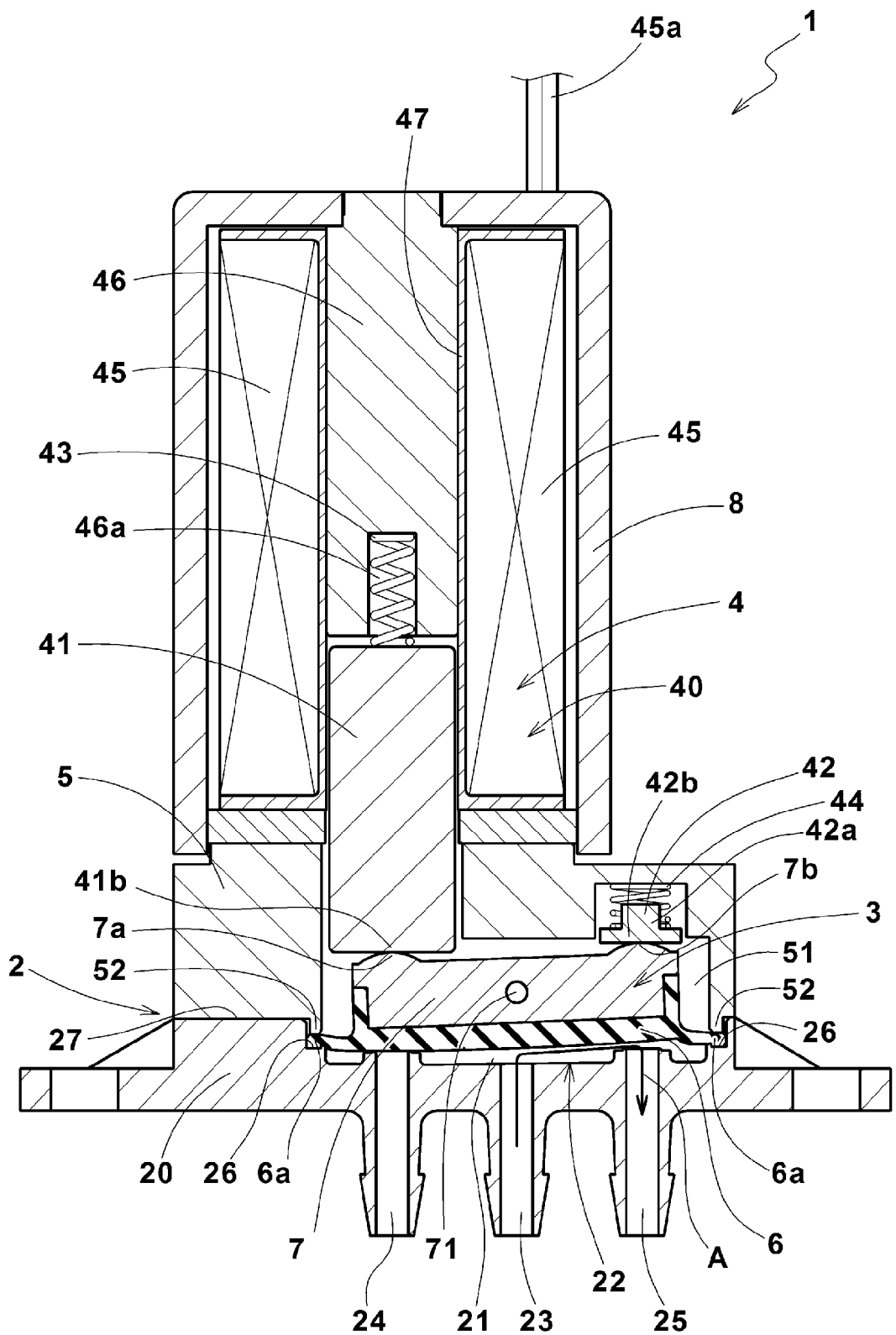
FIG. 1 A cross-sectional view showing a valve device according to an embodiment of the present invention.

FIG. 1 is a cross-sectional view of a valve device 1 in the present embodiment. As shown in FIG. 1, the valve device 1 in the present embodiment has a valve main body 2 having a port through which fluid flows, and defining a valve chest, a valve 3 for opening and closing the port, and a driving means 4 for driving the valve 3 to open and close the port.

The valve main body 2 has a flow path block 20 and a sub-block 5. The flow path block 20 is, for example, formed of a resin material, and has a concave portion 22 constituting a valve chest 21 which is a space through which fluid flows, an inlet port 23 (common port) communicating with the valve chest 21, a NC (Normally Close) outlet port 24 (first outlet port), a NO (Normally open) outlet port 25 (second outlet port), and a holding surface 26 for holding the valve 3.

As shown in FIG. 1, the inlet port 23 is always opened. From the inlet port 23, the fluid is supplied into the valve chest 21. In the normal state, the NC outlet port 24 is closed, and the NO outlet port 25 is opened; the fluid flowing from the inlet port 23 into the valve chest 21 flows along the arrowed line (A) and flows out from the NO outlet port 25.

The valve 3 has a diaphragm 6 disposed to cover the valve chest 21, and a swing member 7 provided swingably with respect to the valve main body 2.

The diaphragm 6 is, for example, formed by a rubber material. By being attached to the valve main body 2 so as to cover a concave portion 22, the diaphragm 6 forms a valve chest 21 between the concave portion 22 and the diaphragm 6. The diaphragm 6 has a peripheral portion 6a extending outwardly.

The swing member 7 is integrated with the diaphragm 6. The swing member 7 has a shaft member 71 which supports the swing member 7 rotatably. The swing member 7 is, for example, formed of a resin material and disposed above the inlet port 23. The shaft member 71 is, for example, formed of a metallic material. The shaft member 71 is disposed above the inlet port 23, substantially perpendicularly to the inlet port 23. And both ends thereof are supported by the sub-blocks 5.

As the swing member 7 rotates like a seesaw around the shaft member 71 as the rotational axis, one of the NC outlet port 24 and the NO outlet port 25 is closed, and the other is opened. Thereby, each port is alternately opened and closed.

The driving means 4 has a valve driving unit 40 for driving the swing member 7, and a frame 8 supporting the valve driving unit 40. The drive means 4 presses the swing member 7 to cause the diaphragm 6 being seated on or being separated from the valve seat of the NC outlet port 24 or NO outlet port 25 to close or open the port.

The valve device 1 of the present embodiment is a so-called solenoid valve in which, by the electromagnetic force generated by the driving means 4, the diaphragm 6 is driven to open and close the port.

The sub-block 5 is, for example, formed of a resin material, and the sub-block has an accommodating portion 51 accommodating the swing member 7 and the like, and a pressing portion 52 pressing the diaphragm 6 to the holding surface 26. The sub-block 5 is mounted to the mating surface 27 in which the concave portion 22 of the flow path block 20 is formed, and the sub-block is fixed to the flow path block 20 by screws (not shown) or the like.

The outer peripheral portion 6a of the diaphragm 6 is held and bound between the holding surface 26 of the flow path block 20 and the pressing portion 52 of the sub-block 5 by being sandwiched therebetween, and closely contacts with the flow path block 20. Thereby, the valve chest 21 is sealed, the fluid is prevented from leaking toward the outside of the flow path block 20.

At the top of the sub-block 5, the frame 8 is provided. The frame 8 houses the valve driving unit 40.

The valve driving unit 40 has a first plunger (movable iron core) 41, a second plunger 42, a first coil spring 43, a second coil spring 44, a solenoid coil 45, and a fixed iron core 46. The first plunger 41 is disposed above the NC outlet port 24. The first plunger 41 is inserted in a coil bobbin 47 around which the solenoid coil 45 is wound.

The fixed iron core 46 is provided with a concave portion 46a in which the first coil spring 43 is loaded.

One end of the first coil spring 43 contacts with the bottom of the concave portion 46a of the fixed iron core 46, and the other end contacts with the top surface of the first plunger 41.

The first coil spring 43 pushes down the first plunger 41 toward a first contact portion 7a of the swing member 7. With this, the tip end 41b of the first plunger 41 presses the first contact portion 7a of the swing member 7.

The spring load of the first coil spring 43 is set to be larger than the spring load of the second coil spring 44.

The second plunger 42 is disposed above the NO outlet port 25. The second plunger 42 is provided with a cylindrical portion 42a in which the second coil spring 44 is inserted, and a flange-shaped tip end portion 42b formed at the end edge of the cylindrical portion 42a.

One end of the second coil spring 44 contacts with the tip end portion 42b of the second plunger 42, and the other end contacts with the bottom of the recess of the sub-blocks 5. The second coil spring 44 pushes down the second plunger 42 toward a second contact portion 7b of the swing member 7. With this, the tip end portion 42b of the second plunger 42 presses the contact portion 7b of the swing member 7.

The solenoid coil 45 is wound around the cylindrical coil bobbin 47. The solenoid coil 45 generates an electromagnetic force by energization.

The solenoid coil 45 is applied by a predetermined current so as to generate an electromagnetic force larger than the difference between the load of the first coil spring 43 and the load of the second coil spring 44.

A cable 45a for power feeding to the solenoid coil 45 and the like is led into the frame 8.

In the frame 8, the first plunger 41, the first coil spring 43, the solenoid coil 45, the fixed iron core 46 and the coil bobbin 47 are housed.

The solenoid coil 45, the fixed iron core 46 and the coil bobbin 47 are fixed to the frame 8.

Hereinafter, the switching action of the valve device 1 is described.

As already mentioned, the spring load of the first coil spring 43 is greater than the spring load of the second coil spring 44, therefore, the elastic force generated by the first coil spring 43 is greater than the elastic force generated by the second coil spring 44.

In the normal state, therefore, the posture of the diaphragm 6 is, as shown in FIG. 1, maintained at that rotated counterclockwise in the figure, wherein the NC outlet port 24 is closed, and the NO outlet port 25 is opened. With this, as indicated by an arrow A, the fluid flowing into the valve chest 21 from the inlet port 23 is discharged from the NO outlet port 25.

Figure 2:
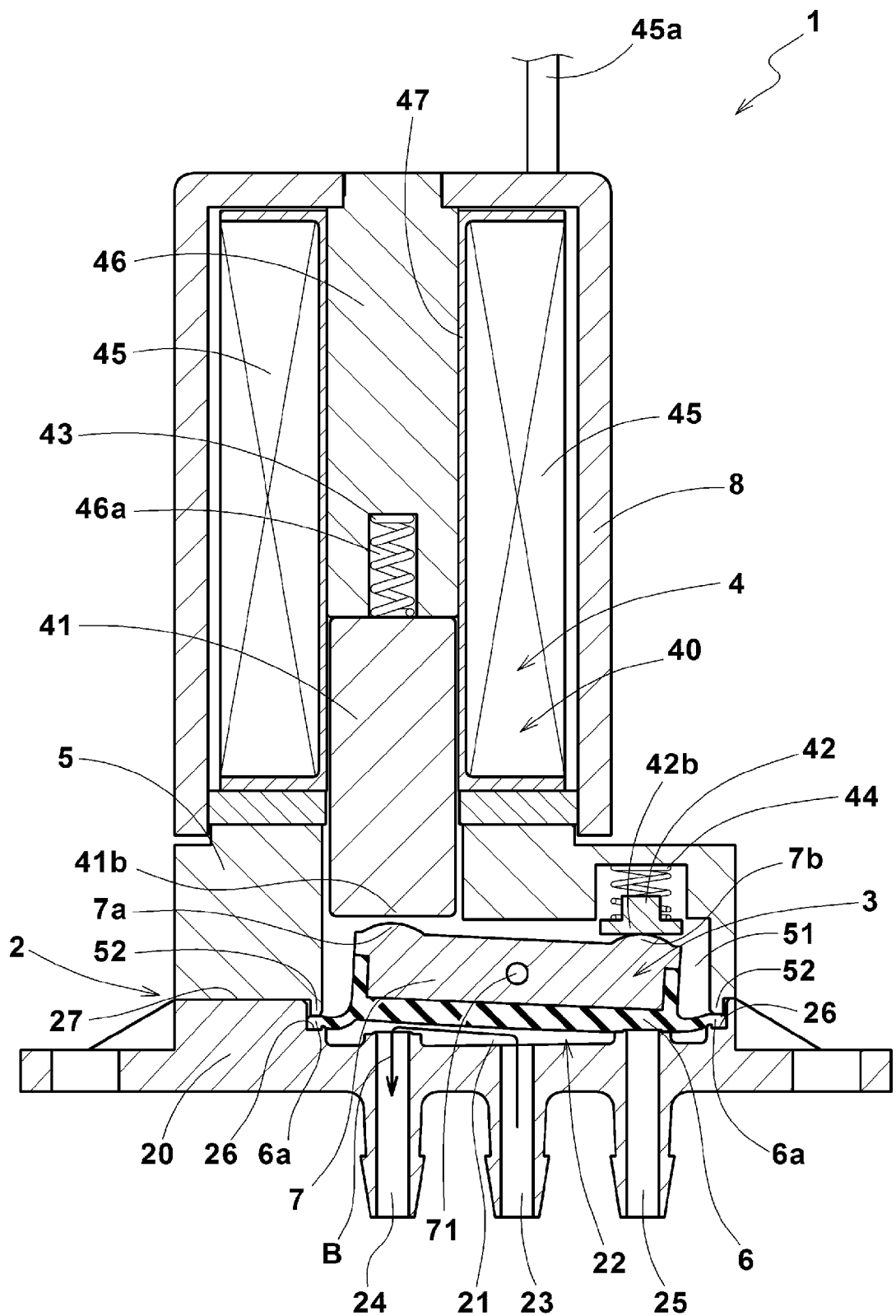
FIG. 2 A cross-sectional view showing the valve device in a state in which a solenoid coil in FIG. 1 is energized.

FIG. 2 shows the valve device 1 in a state where the solenoid coil 45 is energized. When a predetermined current flows through the solenoid coil 45, then by the electromagnetic force, the first plunger 41 is moved in a direction to compress the first coil spring 43. At this time, since the tip end portion 42b of the second plunger 42 presses the second contact portion 7b of the swing member 7, the diaphragm 6 is rotated clockwise, the NO outlet port 25 is closed, and the NC outlet port 24 is opened. With this, as indicated by an arrow B, the fluid flowing into the valve chest 21 from the inlet port 23 is discharged from the NC outlet port 24.

Figure 3:
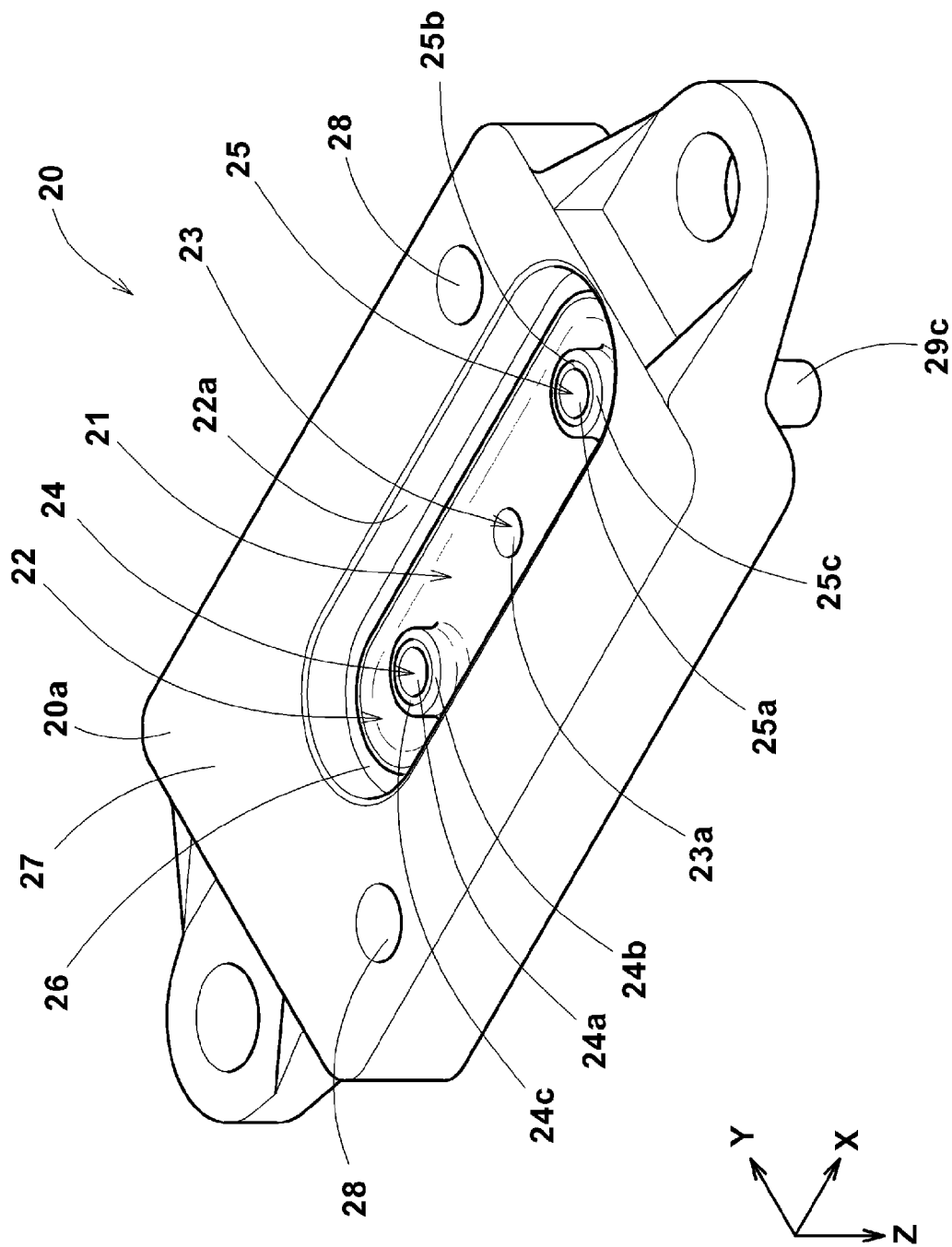
FIG. 3 A perspective view of a flow path block in FIG. 1.
Figure 4:
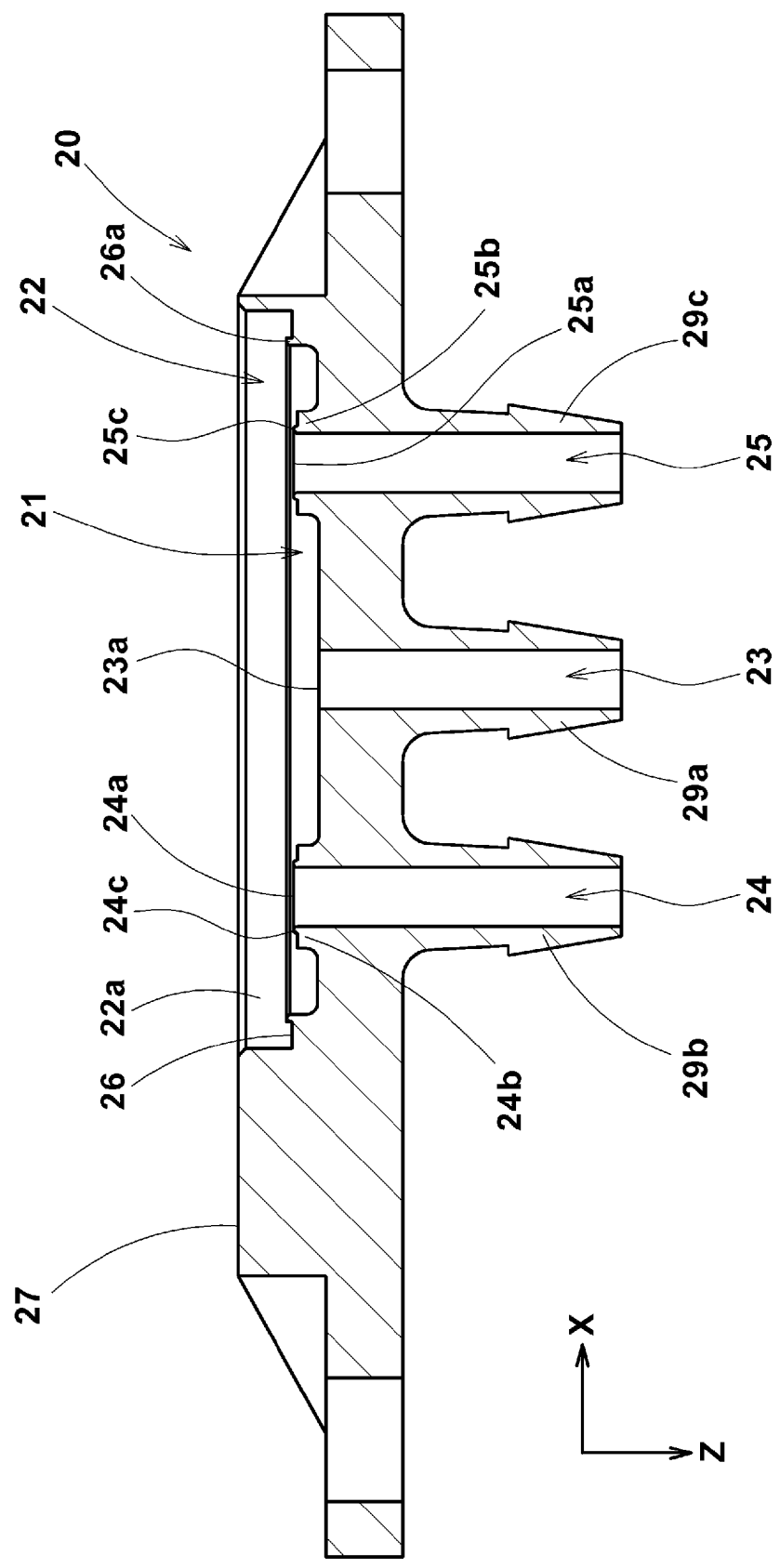
FIG. 4 A cross-sectional view of the flow path block in FIG. 1.

FIG. 3 and FIG. 4 show the flow path block 20.

The flow path block 20 is provided with a concave portion 22 partitioning the valve chest 21.

The concave portion 22 is formed so as to dent from the mating surface 27 to which the sub-block 5 is jointed.

As shown in FIG. 4, a NC outlet nipple 29b, an inflow nipple 29a and a NO outflow nipple 29c are formed to protrude from the rear surface opposite to the mating surface 27.

The inlet port 23 is formed to penetrate through the inflow nipple 29a from the concave portion 22.

The NC outlet port 24 is formed to penetrate through the NC outflow nipple 29b from the concave portion 22, and the NO outlet port 25 is formed to penetrate through the NO outflow nipple 29c from the concave portion 22.

The NC outlet port 24, the inlet port 23 and the NO outlet port 25 are arranged in this order.

The inlet port 23 has an inlet opening 23a which opens to face the concave portion 22. The inlet opening 23a is formed to communicate with the valve chest 21. The inlet port 23 lets the fluid flow from the inlet opening 23a into the valve chest 21.

The NC outlet port 24 and the NO outlet port 25 have outflow openings 24a, 25a which open to face the concave portion 22. The outflow openings 24a, 25a are formed to communicate with the valve chest 21. The NC outlet port 24 and the NO outlet port 25 let the fluid flow out of the valve chest 21 through the outflow openings 24a, 25a.

The outflow opening 24a of the NC outlet port 24 is provided with a first valve seat 24b, and the outflow opening 25a of the NO outlet port 25 is provided with a second valve seat 25b.

The first valve seat 24b and the second valve seat 25b are formed in tubular shapes protruding toward the diaphragm 6. With the swing action of the swing member 7, the diaphragm 6 closely contacts with the tip end of the first valve seat 24b or the second valve seat 25b, and the NC outlet port 24 or the NO outlet port 25 is closed. At this time, the other outlet port is opened, and the fluid flowing into the valve chest 21 from the inlet port 23 is discharged from the opened outlet port toward the outside of the valve device 1. since the first valve seat 24b and the second valve seat 25b are formed so as to protrude toward the diaphragm 6, it is possible to improve the sealing between the diaphragm 6 and the first valve seat 24b and second valve seat 25b when the port is closured. Thereby, it is possible to prevent the fluid from leaking from the valve chest 21 to the NC outlet port 24 or NO outlet port 25 when the NC outlet port 24 or NO outlet port 25 is closed.

The seating face of the first valve seat 24b at the tip is provided with a first raised portion 24c which is raised toward the diaphragm 6. The first raised portion 24c is formed continuously in the circumferential direction on the opening side of the NC outlet port 24, namely, in the inner peripheral portion of the first valve seat 24b. By the first raised portion 24c, the sealing between the first valve seat 24b and the diaphragm 6 when the NC outlet port 24 is closed is more enhanced, and the leakage of the fluid is prevented. Similarly, the second valve seat 25b of the NO outlet port 25 is provided with a first raised portion 25c.

The holding surface 26 is formed in the peripheral edge of the concave portion 22. The mating surface 27 and the holding surface 26 are formed at different levels through the intervention of the side wall 22a of the concave portion 22. In the inner peripheral part of the holding surface 26, there is formed a second raised portion 26a which is raised toward the diaphragm 6. The second raised portion 26a is formed continuously in the circumferential direction. By the second raised portion 26a, the sealing between the outer peripheral portion 6a of the holding surface 26 and the diaphragm 6 is enhanced, and the leakage of the fluid is prevented.

On the periphery of the concave portion 22, a pair of through holes 28 are formed substantially on the opposing corners of a main body portion 20a of the flow path block 20. The flow path block 20 and the sub-block 5 are fixed by screws penetrating the through holes 28.

Figure 5:
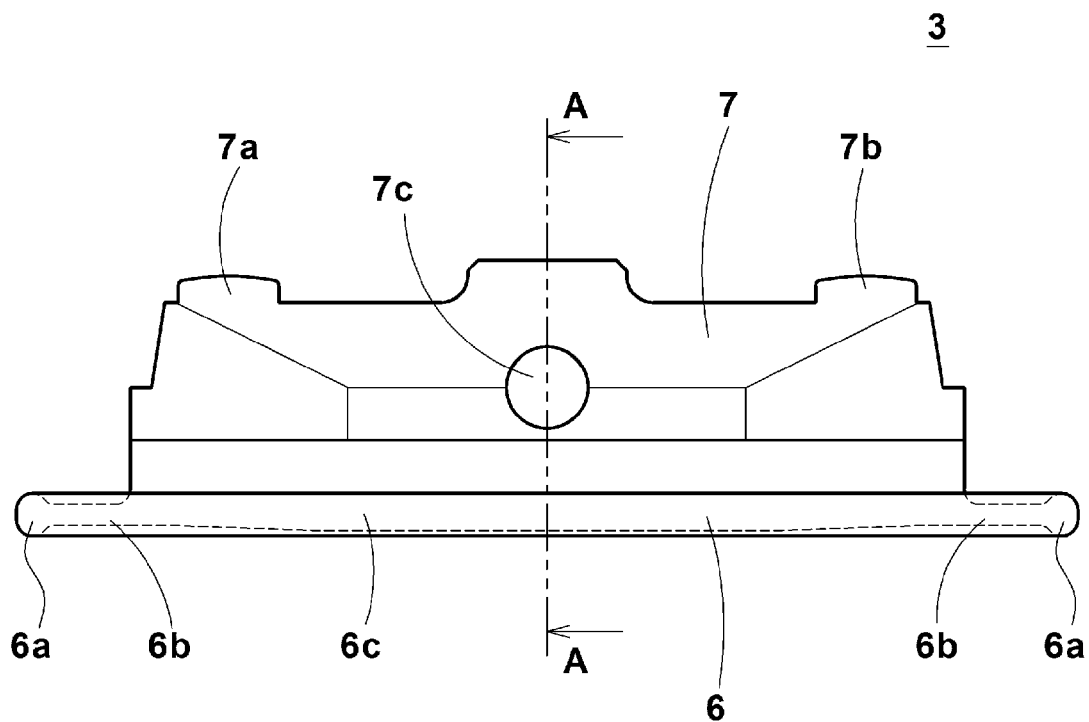
FIG. 5 (a) is a side view of an oscillating member to which the diaphragm is attached, (b) is an A-A line cross-sectional view of (a).
Figure 5:
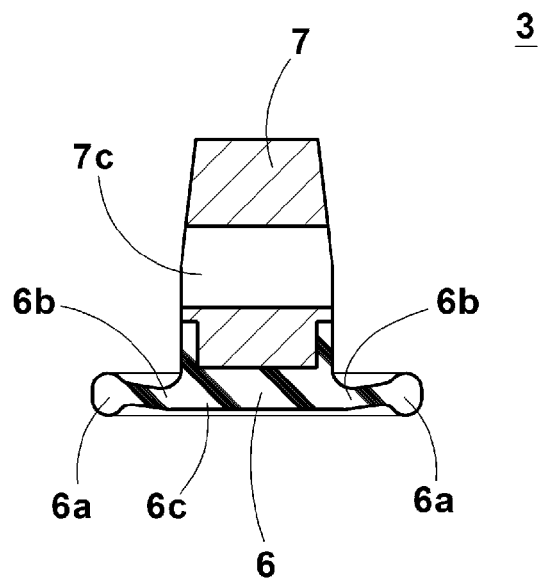

In FIG. 5, there is shown the valve 3 in which the diaphragm 6 is attached to the swing member 7. The center portion of the swing member 7 is provided with a through hole 7c into which a shaft member 71 (see FIG. 1) is inserted. The through hole 7c is formed to penetrate the swing member 7 in the horizontal direction. The through hole 7c is disposed between the first contact portion 7a and the second contact portion 7b, and the distance from the through hole 7c to the first contact portion 7a is equal to the distance from the through hole 7c to the second contact portion 7b. At the bottom of the swing member 7, the diaphragm 6 is mounted. On the inside of the outer peripheral portion 6a of the diaphragm 6, a membrane portion 6b whose thickness is smallest in the diaphragm 6 is provided. The membrane portion 6b is formed along the entire circumference of the diaphragm 6. On the inside of the membrane portion 6b, there is formed a bottom surface 6c seating on the first valve seat 24b or the second valve seat 25b when the port is closed. As a result of an elastic deformation of the membrane portion 6b of the diaphragm 6 following to the swing motion of the swing member 7, the valve chest 21 is maintained between the flow path block 20 and the diaphragm 6.

In the present invention, in order to achieve both of the sealing capability and durability of the diaphragm 6, the hardness of the elastic material forming the diaphragm 6 is defined. That is, the durometer A hardness in JIS-K6253 of the elastic material forming the diaphragm 6 is preferably A50 or more, more preferably A60 or more, still more preferably A65 or more, and preferably A85 or less, more preferably the A80 or less, still more preferably A75 or less. If the durometer A hardness of the elastic material forming the diaphragm 6 is less than A50, during the port is closed where the bottom surface 6c of the diaphragm 6 is seated on the first valve seat 24b or the second valve seat 25b, the deformation of the bottom surface 6c of the diaphragm 6 becomes excessively large, the fatigue of the elastic material forming the diaphragm 6 is accelerated, and the lifetime of the diaphragm 6 may become shorter. On the other hand, if the durometer A hardness of the elastic material forming the diaphragm 6 is more than A85, the bottom surface 6c of the diaphragm 6 becomes hard to deform along the outer shape of the first valve seat 24b or the second valve seat 25b, and adequate sealing capability may not be obtained.

In the present embodiment, for example, the diaphragm 6 is made of an elastic material containing, as its rubber component, at least one kind of ethylene-propylene-diene (EPDM), fluorinated rubber (FKM, FPM, FFKM), hydrogenated nitrile rubber (HNBR), butylene rubber (IIR) and silicone rubber (vMQ).

If a rubber material whose polymer main chain includes a double bond is used, there is a possibility that the polymer main chain is broken during long-term use, and the diaphragm 6 can not maintain its durability. From the view points of gas barrier properties, heat resistance, chemical resistance and production cost, the ethylene-propylene-diene is particularly preferable among the above-mentioned rubber components.

The diaphragm 6 is a part used dynamically such that contacts with the first valve seat 24b, the second valve seat 25b and the like and elastic deformation are repeated, and the diaphragm wears gradually during long-term use. Therefore, in order to improve the wear resistance of the diaphragm 6, it is preferred that the hardness is adjusted within the above-mentioned range by adding a filler to the elastic material. As to the filler, it is desirable to contain at least one kind of carbon black and inorganic fillers such as calcium carbonate, silica, barium sulfate and talc. From the view point of the durability of the diaphragm 6, the amount of the filler is preferably not less than 10 parts by weight, more preferably not less than 20 parts by weight, and preferably not more than 70 parts by weight, more preferably not more than 80 parts by weight.

If the amount of the filler is less than 10 parts by weight inclined with respect to 100 parts by weight of the rubber component, then the resistance to wear becomes insufficient, and the lifetime of the diaphragm 6 is shortened. If the amount of the filler exceeds 80 parts by weight with respect to 100 parts by weight of the rubber component, then the bending fatigue resistance of the diaphragm 6 is reduced, and the lifetime of the diaphragm 6 is shortened.

It is desirable than the thickness of the membrane portion 6b of the diaphragm 6 is 0.2 to 1.0 mm.

If the thickness of the membrane portion 6b of the diaphragm 6 is less than 0.2 mm, there is a possibility that the membrane portions 6b is broken during long term use, and although the NC outlet port 24 or NO outlet port 25 is in the closed state, the fluid leaks to the port.

If the thickness of the membrane portion 6b of the diaphragm 6 is more than 1.0 mm, the force required to swing the swing member 7 becomes increased, and there is a possibility that the solenoid coil 45 or the like becomes large-sized.

In the present invention, in order to achieve both of the sealing capability and the durability of the diaphragm 6, the pressure on the first valve seat 24b or the second valve seat 25b, which is of the diaphragm 6 seating on the first valve seat 24b or the second valve seat 25b, is defined.

That is, it is preferred that the pressure on the first valve seat 24b or the like of the diaphragm 6 is 0.5 to 1.0 N/sq·mm.

If the pressure on the first valve seat 24b and the like, of the diaphragm 6 is less than 0.5 N/sq·mm, then the bottom surface 6c of the diaphragm 6 becomes hard to deform along the outer shape of the first valve seat 24b and the like, and there is a possibility that sufficient sealing capability can not be obtained.

On the other hand, if the pressure on the first valve seat 24b and the like, of the diaphragm 6 is more than 1.0 N/sq·mm, then the deformation of the bottom 6c of the diaphragm 6 when seating becomes excessively large, and there is a possibility that the fatigue of the elastic material constituting the diaphragm 6 is accelerated, and the lifetime of the diaphragm 6 becomes shorter. The pressure on the first valve seat 24b, of the diaphragm 6 is calculated as the force of the diaphragm 6 to press the first valve seat 24b divided by the contact area S1 of the diaphragm 6 and the first valve seat 24b.

Similarly, the pressure on the second valve seat 25b, of the diaphragm 6 is calculated as the force of the diaphragm 6 to press the second valve seat 25b divided by the contact area S2 of the diaphragm 6 and the second valve seat 25b.

The difference between the pressure of the diaphragm 6 seating on the first valve seat 24b of the NC outlet port 24 and the pressure of the diaphragm 6 seating on the first valve seat 25b of the NO outlet port 25 is preferably 0.02 N/sq·mm or more, more preferably 0.04 N/sq·mm or more, and preferably 0.40 N/sq·mm or less, more preferably 0.2 N/sq·mm or less.

If the above-mentioned difference between the pressure on the first valve seat 24b and the pressure on the second valve seat 25b, of the diaphragm 6 is less than 0.02 N/sq·mm, there is a possibility that sufficient sealing capability can not be obtained.

On the other hand, if the difference between the pressure on the first valve seat 24b and the pressure on the second valve seat 25b, of the diaphragm 6 is more than 0.40 N/sq·mm, there is a possibility that the wear of the diaphragm 6 concentrates on the side where the pressure is larger, and the lifetime of the diaphragm 6 becomes shorter.

In the present embodiment, in order that the pressure on the first valve seat 24b or the second valve seat 25b, of the diaphragm 6 when seating is set within the above range, the load which the valve driving unit 40 applies to the diaphragm 6 via the swing member 7 is set within the following range.

Figure 6:
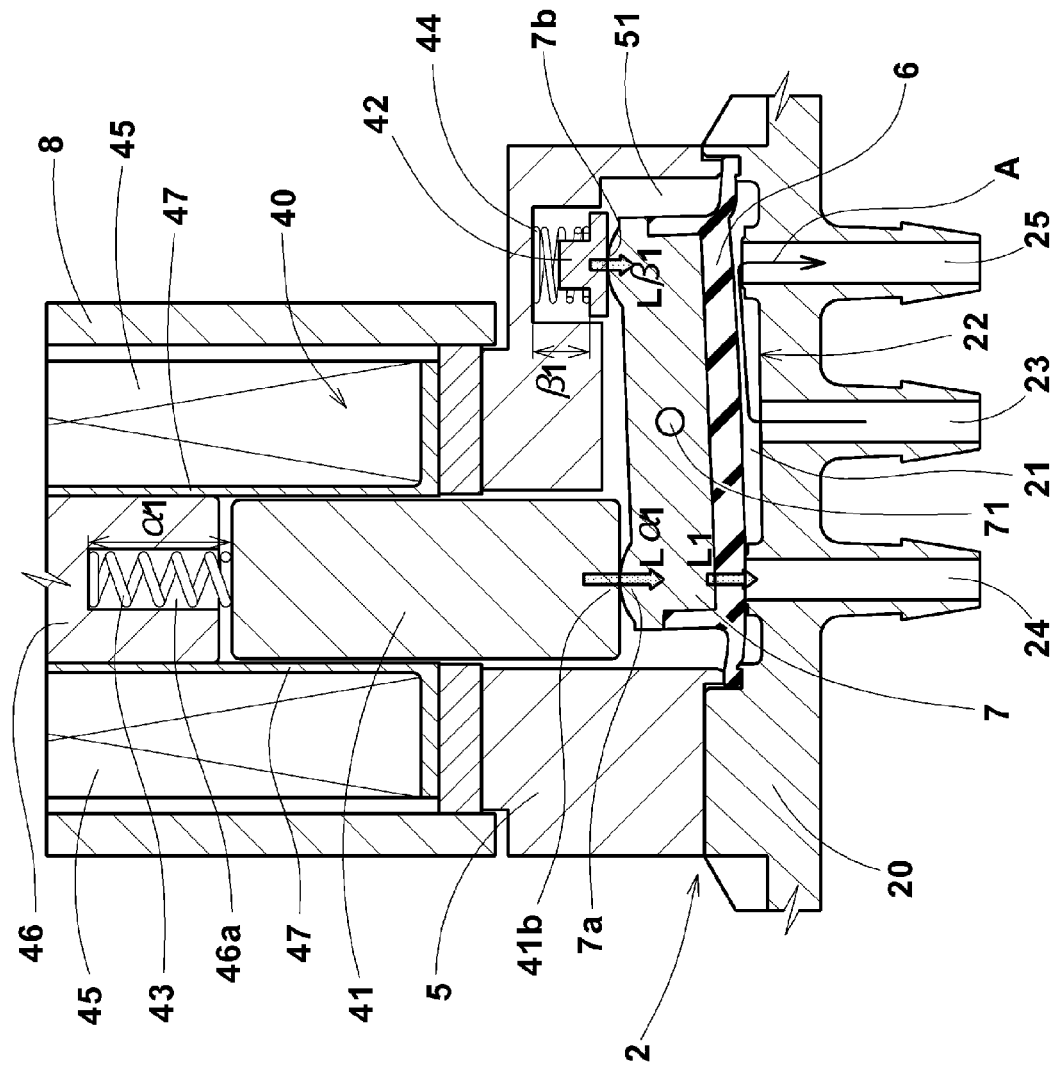
FIG. 6 A cross-sectional view showing a main part of the valve device in a state in which a NC outlet port is closed.

In FIG. 6, there is shown a main part of the valve device 1 under such a condition that the NC outlet port 24 is closed by the diaphragm 6.

In the state of the diaphragm 6 seating on the first valve seat 24b, i.e., when the electrical signal in order to raise the first plunger 41 is not supplied to the solenoid coil 45, the load L1 of the swing member 7 to press a first valve seat 24b side of the diaphragm 6 is preferably not less than 2.9 N, more preferably not less than 3.2 N, and preferably, not more than 4.0 N, more preferably not more than 3.8 N.

In such state, both of the first plunger 41 and the second plunger 42 contact with the swing member 7, and the forces transmitted to the swing member 7 by the first plunger 41 and the second plunger 42 are canceled. Therefore, the load L1 of the swing member 7 to press the first valve seat 24b side of the diaphragm 6 is calculated by the difference between the load Lα1 by the first coil spring 43 when the length is al and the load Lβ1 by the second coil spring 44 when the length is β1.

If the Load L1 of the swing member 7 to press the first valve seat 24b side of the diaphragm 6 is less than 2.9 N, the bottom surface 6c of the diaphragm 6 becomes hard to deform along the outer shape of the first valve seat 24b and the like, and there is a possibility that sufficient sealing capability can be obtained.

On the other hand, if the Load L1 of the swing member 7 to press the first valve seat 24b side of the diaphragm 6 is more than 4.0 N, the deformation of the bottom surface 6c of the diaphragm 6 seating on the first valve seat 24b becomes excessively large, and there is a possibility that the fatigue of the elastic material forming the diaphragm 6 is accelerated, and the lifetime of the diaphragm 6 becomes shorter.

Further, in the state where the NC outlet port 24 is closed by the diaphragm 6, it is desirable that the load by the first coil spring 43 alone is 5.8 N to 8.0 N, and it is desirable that the load by the second coil spring 44 alone is 2.9 N to 4.0 N.

If the load by the first coil spring 43 alone is less than 5.8 N, and if the load by the second coil spring 44 alone is less than 2.9 N, then the bottom surface 6c of the diaphragm 6 becomes hard to deform along the outer shape of the second valve seat 25b and the like, and there is a possibility that sufficient sealing capability can be obtained.

On the other hand, if the load by the first coil spring 43 alone is more than 8.0 N, and if the load by the second coil spring 44 alone is more than 4.0 N then the size of the solenoid coil 45 increases, and it becomes difficult to achieve the downsizing of the valve device 1.

Figure 7:
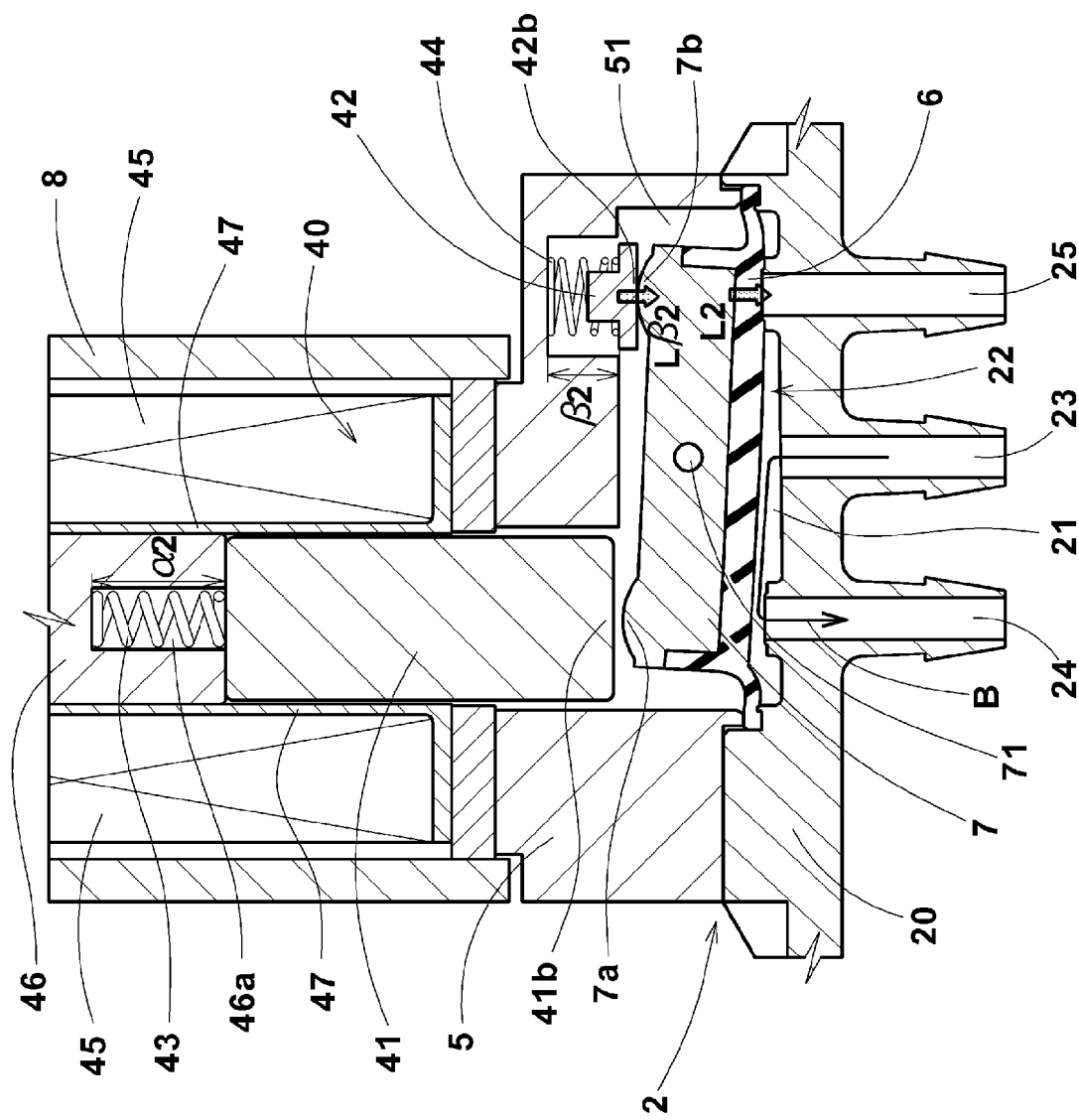
FIG. 7 A cross-sectional view showing the main part of the valve device in a state in which a NO outlet port is closed.

In FIG. 7, there is shown the main part of the valve device 1 under such a condition that the NO outlet port 25 is closed by the diaphragm 6.

In the state of the diaphragm 6 seating on the second valve seat 25b, i.e., when the electrical signal to raise the first plunger 41 is supplied to the solenoid coil 45, the load L2 of the swing member 7 to press a second valve seat 25b side of the diaphragm 6 is preferably not less than 2.4 N, more preferably not less than 2.7 N, and preferably m\not more than 3.5 N, more preferably not more than 3.3 N.

In this state, as the first plunger 41 is spaced apart from the swing member 7, a force is not transmitted to the swing member 7 by the first plunger 41. Accordingly, the load L2 of the swing member 7 to press the second valve seat 25b side of the diaphragm 6 becomes equal to the load Lβ2 by the second coil spring 44 when the length is β2, the gravity and the like. If the load L2 of the swing member 7 to press the second valve seat 25b side of the diaphragm 6 is less than 2.4 N, then the bottom surface 6c of the diaphragm 6 becomes hard to deform along the outer shape of second valve seat 25b and the like, and there is a possibility that sufficient sealing capability can not be obtained.

On the other hand, if the load L2 of the swing member 7 to press the second valve seat 25b side of the diaphragm 6 is more than 3.5 N, then the deformation of the bottom surface 6c of the diaphragm 6 seating on the second valve seat 25b is excessively increased, and there is a possibility that the fatigue of the elastic material forming the diaphragm 6 is accelerated, and the lifetime of the diaphragm 6 becomes shorter. Even in this case, it is necessary that the spring load of the first coil spring 43 is increased more than the spring load of the second coil spring 44. For this reason, it is necessary to increase the electromagnetic force generated by the solenoid coil 45. As a result, an increase in the size of the solenoid coil 45 is necessitated, and it becomes difficult to downsize the driving means 4 and thus to downsize the valve device 1.

Further, in the state where the NO outlet port 25 is closed by the diaphragm 6, it is preferable that the load by the second coil spring 44 alone is 2.4 N to 3.5 N.

If the load by the second coil spring 44 alone is less than 2.4 N, then the bottom surface 6c of the diaphragm 6 becomes hard to deform along the outer shape of the second valve seat 25b and the like, and there is a possibility that sufficient sealing capability can not be obtained.

On the other hand, if the load by the second coil spring 44 alone is more than 3.5 N, then the load by the first coil spring 43 alone is need to be increased more than that. As a result, it becomes difficult to downsize the driving means 4 and thus the valve device 1 similarly to the above.

As described above, according to the valve device 1 of the present invention, the diaphragm 6 is made of an elastic material whose durometer A hardness in JIS-K6253 is A50 to A85, and the pressure on the first valve seat 24b or the second valve seat 25b, of the diaphragm 6 when sitting is 0.5 to 1.0 N/sq·mm. In this way, as the hardness and seating pressure of the diaphragm 6 are improved, excessive deformation of the diaphragm 6 when sitting can be suppressed, and thereby the durability of the diaphragm 6 can be improved.

Further, the diaphragm 6 is moderately deformed with respect to the first valve seat 24b or the second valve seat 25b, and sufficient sealing capability can be obtained.

Furthermore, since there is no need to press the diaphragm 6 at excessively heavy load, the valve driving unit 40 such as the solenoid coil 45 can be miniaturized.

In FIGS. 3 to 4 and so on, there is shown the flow path block 20 of a three-way valve having two systems of the outlet ports 24, 25 for the single inlet port 23.

Such flow path block 20 can be used as a two-way valve by always closing either one of the outlet ports 24 and 25, for example, the outlet port 24. Even in such a usage pattern, the same effects as described above can be obtained since the hardness and seating pressure of the diaphragm 6 are improved. Even when the other outlet port 25 is always closed, it is the same as described above.

Further, even in such a structure that either one of the outlet ports is omitted from the flow path block 20, it is possible to use it as a two-way valve in the same manner as described above, and the same effects as described above can be obtained. In this case, it is not necessary to arrange the inlet port 23 in the central portion of the valve chest 21. It may be disposed on the side of the omitted outlet port.

While detailed description has been made of a valve device according to the present invention, the present invention can be embodied in various forms without being limited to the above described specific embodiment.

Working Example

The valve device having the basic structure shown in FIG. 1 was experimentally manufactured based on the specifications shown in Table 1, and the sealing performance and durability of the diaphragm were evaluated.

The diaphragms of each specification was experimentally manufactured by cross-linking molding using a press machine. In the measurement of the hardness, a type-A durometer hardness according to JIS K 6253-3 was measured.

The test methods are as follows.

<Sealing Performance>

The diaphragm of each specification was incorporated into a valve device, and the sealing performance was measured. More specifically, inputting an air inflow of 0.3 MPa through the inlet port, the pressure of the air after 3 minutes was measured. The result is an index based on working Example 1 being 100, wherein the larger value indicates that the sealing performance of the diaphragm is better.

<Durability>

The valve device in which the diaphragm of each specification was incorporated was subjected to idle operations ten million times at a frequency of 5 Hz at a room temperature of 20 degrees C. Then, inputting an air flow of 0.3 MPa through the inlet port, the pressure of the air after three minute was measured. The result is an index based on working Example 1 being 100, wherein the larger value indicates that the fatigue of the diaphragm is less, and the durability is better.

As shown in Table 1, it was confirmed that the valve devices as working Examples were significantly excellent at the sealing performance and durability as compared with Comparative Examples.

DESCRIPTION OF THE SYMBOLS 1 valve device
2 valve main body
3 valve
4 driving means
6 diaphragm
7 swing member
21 valve chest
22 concave portion
23 inlet port
23a inlet opening
24 NC outlet port (first port)
24a outflow opening
24b first valve seat
25 NO outlet port (second port)
25A outflow opening
25b second valve seat

TABLE 1

|  |  | Working Example 1 | Working Example 2 | Working Example 3 | Working Example 4 | Working Example 5 | Working Example 6 |
|---|---|---|---|---|---|---|---|
| material of diaphragm | | EPDM | BR | EPDM | EPDM | EPDM | EPDM |
| type-A durometer hardness | | A70 | A70 | A60 | A80 | A50 | A85 |
| non-energized state | load L1 (N) | 3.2 | 3.4 | 3.1 | 3.4 | 2.9 | 4.0 |
| | contact area S1 (sq · mm) | 4.0 | 4.0 | 4.0 | 4.0 | 4.0 | 4.0 |
| | pressure of diaphragm (N/sq · mm) | 0.80 | 0.85 | 0.78 | 0.85 | 0.73 | 1.00 |
| energized state | load L2 (N) | 2.9 | 2.9 | 2,6 | 2.7 | 2.4 | 3.5 |
| | contact area S2 (sq · mm) | 4.0 | 4.0 | 4.0 | 4.0 | 4.0 | 4.0 |
| | pressure of diaphragm (N/sq · mm) | 0.73 | 0.73 | 0.65 | 0.68 | 0.60 | 0.88 |
| pressure difference of diaphragm (N/sq · mm) | | 0.08 | 0.13 | 0.13 | 0.18 | 0.13 | 0.13 |
| sealing performance (index) | | 100 | 100 | 100 | 100 | 100 | 90 |
| durability (index) | | 100 | 90 | 100 | 100 | 90 | 90 |

|  |  | Working Example 7 | Working Example 8 | Comparative Example 1 | Comparative Example 2 | Comparative Example 3 | Comparative Example 4 |
|---|---|---|---|---|---|---|---|
| material of diaphragm | | EPDM | EPDM | EPDM | EPDM | EPDM | EPDM |
| type-A durometer hardness | | A70 | A70 | A45 | A90 | A70 | A70 |
| non-energized state | load L1(N) | 3.8 | 3.8 | 3.2 | 3.2 | 2.4 | 4.2 |
| | contact area S1 (sq · mm) | 4.0 | 4.0 | 4.0 | 4.0 | 4.0 | 4.0 |
| | pressure of diaphragm (N/sq · mm) | 0.95 | 0.95 | 0.80 | 0.80 | 0.60 | 1.05 |
| energized state | load L2 (N) | 2.2 | 2.0 | 2.9 | 2.9 | 1.9 | 3.7 |
| | contact area S2 (sq · mm) | 4.0 | 4.0 | 4.0 | 4.0 | 4.0 | 4.0 |
| | pressure of diaphragm (N/sq · mm) | 0.55 | 0.50 | 0.73 | 0.73 | 0.48 | 0.93 |
| pressure difference of diaphragm (N/sq · mm) | | 0.40 | 0.45 | 0.08 | 0.08 | 0.13 | 0.13 |
| sealing performance (index) | | 95 | 90 | 110 | 70 | 70 | 110 |
| durability (index) | | 95 | 90 | 70 | 110 | 110 | 70 |

The invention claimed is:

1. A valve device having
a valve main body defining a valve chest having an inlet port for flowing a fluid into the valve chest, and a first outlet port and a second outlet port for flowing the fluid out from the valve chest;
a valve for opening and closing the ports; and
a drive means for driving the valve to open and close the ports,
wherein the ports have an opening around which a valve seat is formed,
wherein the valve is disposed so as to cover the ports and has a diaphragm for seating on or separating from the valve seat to open and close the ports,
wherein the diaphragm is made of an elastic material whose durometer A hardness in JIS-K6253 is A50 to A85,
wherein the pressure of the diaphragm on the valve seat when seated is 0.5 to 1.0 N/sq·mm
wherein the diaphragm is to open and close the first outlet port and the second outlet port alternately, and
wherein the difference between the pressure of the diaphragm seated on the valve seat of the first outlet port and the pressure of the diaphragm seated on the valve seat of the second outlet port is not more than 0.40 N/sq·mm.

2. The valve device as set forth in claim 1, wherein the durometer A hardness in JIS-K6253 of the diaphragm is A60 to A80.

3. The valve device as set forth in claim 1, wherein the diaphragm includes, as a rubber component, at least one kind of ethylene-propylene-diene, fluorinated rubber, hydrogenated nitrile rubber, butylene rubber and silicone rubber.

4. The valve device as set forth in claim 1, wherein the diaphragm includes, as fillers, at least one kind of calcium carbonate, silica, barium sulfate, talc and carbon black.

5. The valve device as set forth in claim 1, wherein the valve is driven by a driving means to swing, and to open and close the ports.

6. The valve device as set forth in claim 5, wherein the valve is rotatably supported by a shaft member.

7. The valve device as set forth in claim 2, wherein the diaphragm includes, as a rubber component, at least one kind of ethylene-propylene-diene, fluorinated rubber, hydrogenated nitrile rubber, butylene rubber and silicone rubber.

8. The valve device as set forth in claim 2, wherein the diaphragm includes, as fillers, at least one kind of calcium carbonate, silica, barium sulfate, talc and carbon black.

9. The valve device as set forth in claim 3, wherein the diaphragm includes, as fillers, at least one kind of calcium carbonate, silica, barium sulfate, talc and carbon black.

* * * * *